F. H. MOYER.
RING TRUING MACHINE.
APPLICATION FILED FEB. 29, 1912.

1,220,360.

Patented Mar. 27, 1917.
3 SHEETS—SHEET 1.

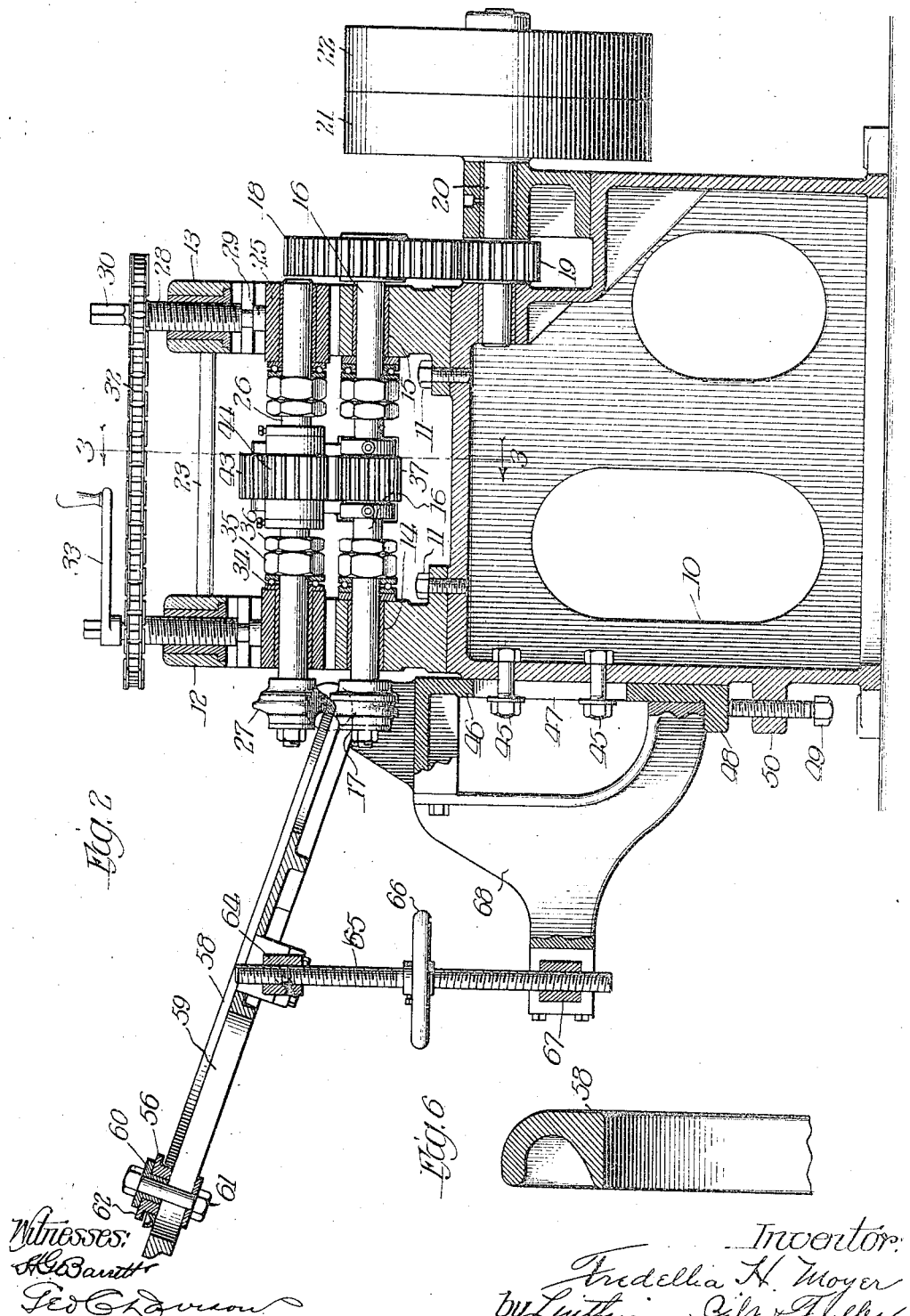

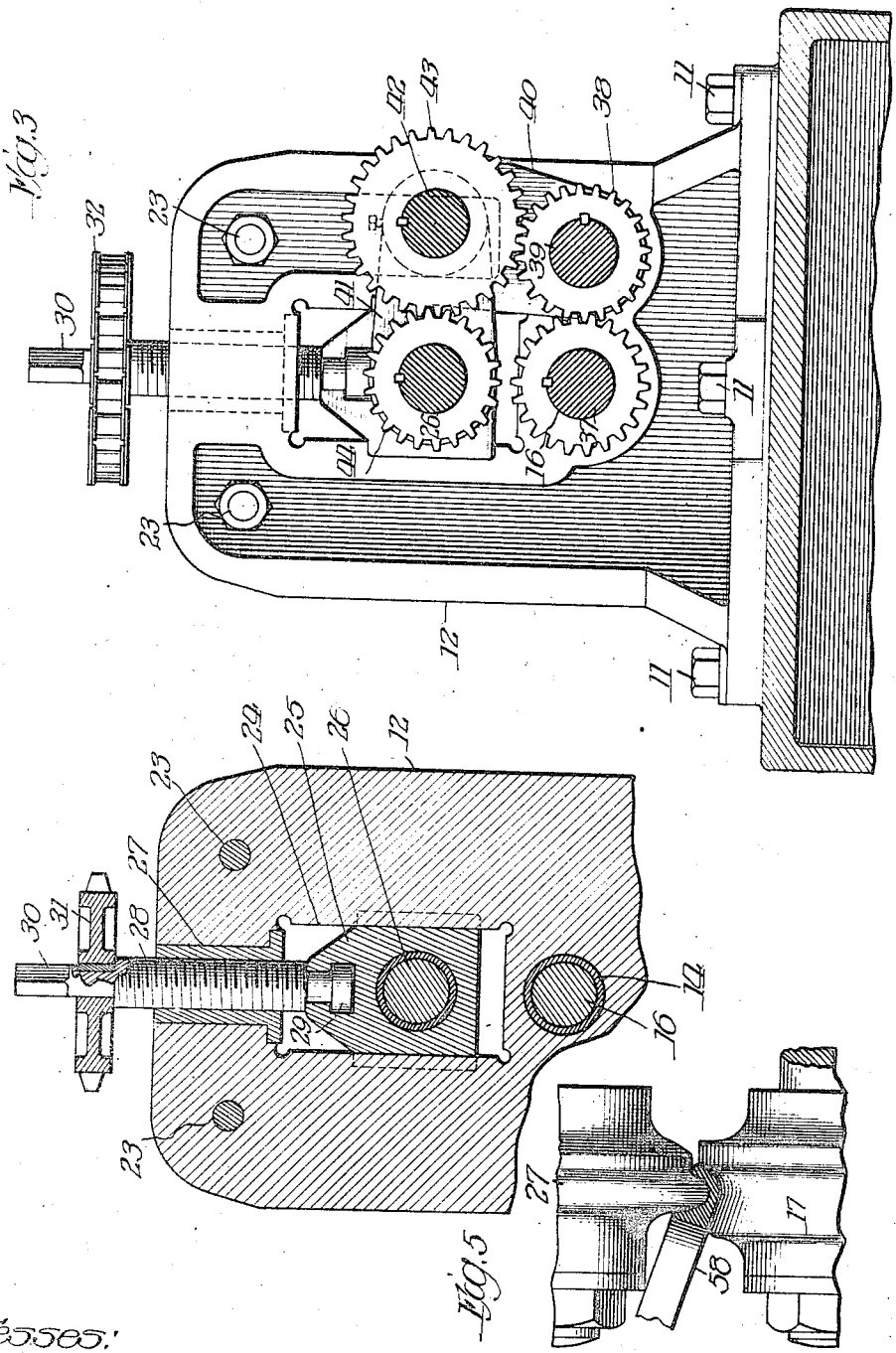

UNITED STATES PATENT OFFICE.

FREDELLIA H. MOYER, OF AKRON, OHIO, ASSIGNOR TO THE FIRESTONE TIRE & RUBBER COMPANY, OF AKRON, OHIO, A CORPORATION OF OHIO.

RING-TRUING MACHINE.

1,220,360.  Specification of Letters Patent.  Patented Mar. 27, 1917.

Application filed February 29, 1912.  Serial No. 680,755.

*To all whom it may concern:*

Be it known that I, FREDELLIA H. MOYER, a citizen of the United States, residing at Akron, in the county of Summit and State of Ohio, have invented certain new and useful Improvements in Ring-Truing Machines, of which the following is a specification.

The side rings which engage the bead portions of pneumatic tires on vehicle wheel rims to removably or detachably maintain the tires in proper relation on their rims, are ordinarily made by rolling straight bars of the proper or desired cross-section. By machinery proper lengths of such bars are curved into annular or ring form. Then the abutting ends are welded together to form a continuous ring. Subsequently the ring is placed upon a sizing machine, which stretches it slightly, if necessary, to give it the proper circular shape and the required diameter. But in passing through these various operations, the cross-section of the ring is likely to become slightly distorted and the object of the present invention is to provide a mechanism of simple and economical character which will true up such sections so that they will meet the rigid requirements of the trade.

In order that those skilled in the art may have a full and complete understanding of this invention, I have illustrated a preferred and desirable embodiment of the same in the accompanying drawings forming a part of this specification, and to which reference should be had in connection with the following detailed description.

In these drawings:

Fig. 2 is a central vertical longitudinal section;

Fig. 3 is a vertical cross-section on line 3—3 of Fig. 2;

Fig. 4 illustrates in section the details of construction of the mechanism for adjusting one of the bearings;

Fig. 5 shows the manner in which the two rolls co-act with the ring, and

Fig. 6 is an enlarged cross-section through the ring.

Figure 1:
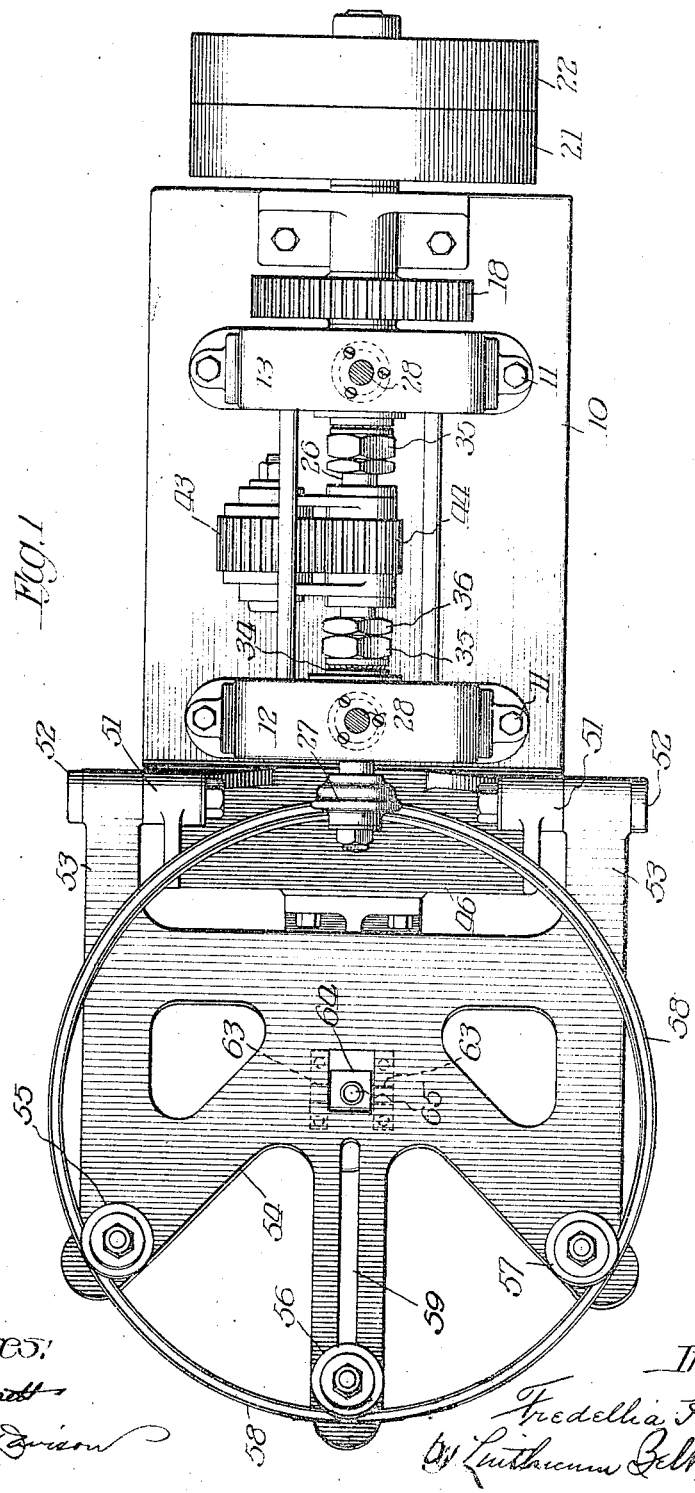
Figure 1 is a plan view of the machine.

Referring to the drawings, it will be noticed that the machine comprises a main frame 10 to the top of which is bolted at 11, 11, the pair of standards 12 and 13, which have provided in their lower portions bearings 14 and 15 for the accommodation of the lower roll shaft 16 which at one end carries the truing roll 17 and at the other end has fastened thereto a gear 18, the teeth of which mesh with a pinion 19 on a lower suitably journaled jack-shaft 20 equipped with tight and loose pulleys 21 and 22. In order that these standards may be properly joined together at their top portions, they are united or tied together by a pair of bolts 23, supplied of course, with the proper heads and nuts. Each standard is recessed at 24 to slidably accommodate a bearing 25 for the upper roll shaft 26, and in order that these bearings may be simultaneously and also independently vertically adjusted to properly position the upper roll 27 carried at one end of the shaft 26, with relation to the ring or flange acted upon, I supply in the top of each of the standards a threaded bushing 27' through which extends a screw-threaded shaft 28 having an enlargement at its lower end 29 received in a similarly shaped cavity of the bearing-block 25. The upper end of the screw 28 is made square at 30, and just below such angular section there is keyed to each of the screws 28 a sprocket wheel 31, a sprocket chain 32 passing around and coacting with the pair of sprocket wheels. If it is desired to vertically adjust one of these bearing-blocks 25 independently of the other, it is merely necessary to temporarily remove the sprocket chain 32 and apply the handle 33 to the top of the screw and turn it until the required adjustment is secured. In case it is necessary to vertically adjust both of the bearing-blocks together, then the chain 32 is permitted to remain in its cooperative relation with the two sprocket wheels and by turning the handle 33 when applied to either of the screws 28, then, as will be readily understood, both bearing blocks rise or fall equal amounts, the adjustment depending upon the extent of turning of the handle.

Each of the shafts 16 and 26, between its pair of bearings, is equipped with a ball-bearing 34 between each pair of nuts 35 and 36 and the end of each adjacent bearing, those portions of the shaft accommodating the nuts being screw-threaded so that by turning the nuts properly, the position of the shafts 16 and 26 may be shifted and the rolls 17 and 27 correspondingly moved. Each nut 35 is, of course, the main adjusting nut, the similar companion nut 36 being the lock nut.

In order to drive the upper shaft 26 from the lower shaft 16, and at the same time permit the vertical adjustment of the upper shaft referred to, I key to shaft 16 a gear 37, the teeth of which mesh with those of a similar gear 38 on the back shaft 39. Rockingly mounted on this shaft 39 are a pair of links 40 and also mounted on the shaft 26 are a pair of links 41. The upper back shaft 42 passes through apertures in all four of these links acting as the hinge pin for such links. On shaft 42 I mount an intermediate gear 43 the teeth of which mesh with gear 40 and also with gear 44 fixed to the upper roll shaft 26, and by this train of gears the power from the lower shaft 16 is transmitted to the upper shaft 26 regardless of the vertical adjustment of the latter shaft, the rocking links at all times maintaining the various gears in proper association.

At one end of the frame 10, by means of a pair of bolts 45, 45, I adjustably fasten the slotted support 46, the bolts passing through the vertical slot 47 of the support as is clearly indicated in Fig. 2. At its lower end, support 46 has an outstanding projection 48 bearing against the bottom face of which is an adjusting screw 49 passing through a threaded aperture in a boss 50 projecting outwardly from the frame 10, as is clearly shown. It should be clear, therefore, that by loosening the nuts 45 and turning the adjusting screw 49, any desirable vertical adjustment of the support can be readily and quickly secured. This support 46 has at its top two upstanding ears 51, 51, to which are hinged by means of hinge-bolts 52, 52, the spaced arms 53, 53, of a skeleton table 54 carrying three rollers 55, 56 and 57 adapted to overhang and properly position the rim side ring 58 which in cross-section is of the substantially hook-shaped form illustrated in Fig. 6. One or more of these rollers may be adjustable so as to more accurately position a ring and accommodate rings of different diameters. In the present form of the device I have shown the table 54 slotted at 59 to permit adjustment of the roller 56, it being understood, as is clearly shown in Fig. 2, that each of these rollers is rotatably mounted on a bushing 60 on a bolt 61, whereby adjustment of the roller toward and from the center of the table may be easily attained. Each roller has a flanged upper portion 62 which overlies the ring 58 to maintain the latter in its proper plane and prevent distortion of any part thereof. Near its center, table 54 has pivoted thereto at 63 a nut 64 passing through which is a screw-threaded rod 65 having fixed thereto, near its central portion, an operating handle 66, the lower end of the screw passing through a nut 67 suitably mounted on a bracket 68 fastened to the adjustable support 46.

From this description and illustration it should be plain that the upper roll 27 is adjustable up and down from and toward the work and may also be canted slightly to properly conform to the hook cross-section of the ring. Furthermore, the table 54 carrying the ring is adjustable vertically by means of the screw 49, and angularly by the screw 65, so that the ring placed upon the table may be brought into proper association with the co-acting rolls 17 and 27 which, during their rotation, true the ring and cause it to rotate on the table so that the entire circumference of the ring is properly trued and shaped, these rolls, as will be evident, constituting the driving means for revolving the ring during the truing action. Before beginning operations, the table is so adjusted with relation to the rolls that the latter have no tendency to bend the ring out of its true plane which is maintained by the table and the anti-friction rollers 55, 56 and 57.

While I have herein indicated my invention as capable of embodiment in a machine for truing side rings of detachable vehicle rims, it is to be understood that the invention is not limited to machines employed for this purpose, since the invention is susceptible of uses in a variety of relations. Furthermore, many minor mechanical changes may be incorporated in the machine illustrated and described herein without departure from the substance and essence of the invention, and without the sacrifice of any of its substantial benefits and advantages.

I claim:

A machine for truing rings having annular grooves in the faces thereof, comprising a pair of coöperating truing rolls having a pass therebetween, one roll having an annular peripheral seat for one side of the work piece, the other roll having its periphery shaped to fit the groove of the work piece, a work table straddling the rolls and pivotally supported on an axis extending through the pass at substantially right angles to the axes of the rolls, a circular guideway for the work including the pass of the truing rolls and anti-friction devices on the table, and means for adjustably tilting the table on its pivotal support and for maintaining the table fixed in any adjusted position during the rotation of the rolls.

FREDELLIA H. MOYER.

Witnesses:
 GEO. F. HAAG,
 R. E. GLASS.